(12) United States Patent
Gschwendtner et al.

(10) Patent No.: US 9,883,622 B2
(45) Date of Patent: Feb. 6, 2018

(54) VEHICLE CONTROL SYSTEM (71) Applicant: AGCO International GmbH, Hesston, KS (US)

(72) Inventors: Christian Gschwendtner, Marktoberdorf (DE); Guenther Ostenried, Marktoberdorf (DE); Ulrich Stich, Blonhofen (DE); Werner Unsinn, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/814,816

(22) Filed: Jul. 31, 2015

(65) Prior Publication Data
US 2016/0029542 A1 Feb. 4, 2016

(30) Foreign Application Priority Data
Jul. 31, 2014 (GB) .................................. 1413547.9

(51) Int. Cl.
*G06F 7/70* (2006.01)
*G06F 19/00* (2011.01)
(Continued)

(52) U.S. Cl.
CPC ............ *A01B 63/10* (2013.01); *A01B 59/041* (2013.01); *A01B 61/02* (2013.01); *A01B 63/102* (2013.01); *B60D 1/30* (2013.01); *A01B 63/112* (2013.01)

(58) Field of Classification Search
CPC ....... A01B 59/041; A01B 61/02; A01B 63/10; A01B 63/102; A01B 63/112
See application file for complete search history.

(56) References Cited

U.S. PATENT DOCUMENTS 3,002,570 A * 10/1961 Kienzle ................ A01B 63/112
172/7
3,604,312 A * 9/1971 Plate .................... A01B 63/112
137/102

(Continued)

FOREIGN PATENT DOCUMENTS

EP 0517426 A2 12/1992
WO 2013053645 A1 4/2013

OTHER PUBLICATIONS

Intellectual Property Office, International Search report for Priority UK Application No. GB14135479, dated Jan. 27, 2015.

*Primary Examiner* — Nicholas Kiswanto
*Assistant Examiner* — Kenny A Taveras (57) ABSTRACT A tractor control system, which controls an operating condition of an implement attached to the tractor. The control system includes a sensing means providing a force signal which indicates the pull force necessary to pull an implement in a desired position; a control which receives the force signal; and means for measuring at least one parameter associated with the tractor mode and/or the implement mode and the implement position is adjusted to a new position when the force signal varies. The control system includes pre-determined values associated with certain tractor and/or implement modes. A measured parameter is compared with a pre-determined parameter value and if the measured parameter would result in an undesired movement of the implement, the force signal is deactivated, or the response to the force signal is deactivated to prevent undesired movement of the attachment.

9 Claims, 4 Drawing Sheets (51) Int. Cl.
*G06G 7/00* (2006.01)
*A01B 63/10* (2006.01)
*A01B 59/041* (2006.01)
*A01B 61/02* (2006.01)
*B60D 1/30* (2006.01)
*A01B 63/102* (2006.01)
*A01B 63/112* (2006.01)

(56) References Cited

U.S. PATENT DOCUMENTS

| | | | |
|---|---|---|---|
| 3,612,088 A * | 10/1971 | McBurnett | A01B 63/112 137/116.3 |
| 4,125,166 A * | 11/1978 | Bergius | A01B 63/112 172/1 |
| 4,231,432 A * | 11/1980 | Jennings | A01B 63/112 172/2 |
| 4,286,669 A * | 9/1981 | Lasoen | G01L 5/136 172/7 |
| 4,289,208 A * | 9/1981 | Roncarolo | A01B 63/112 172/7 |
| 4,499,775 A * | 2/1985 | Lasoen | A01B 63/112 172/430 |
| 4,807,136 A * | 2/1989 | Rutkowski | A01B 63/112 172/7 |
| 4,846,283 A * | 7/1989 | Batcheller | E02F 9/2029 172/10 |
| 4,907,653 A * | 3/1990 | Bellanger | A01B 63/112 172/10 |
| 4,973,206 A * | 11/1990 | Engle | B61D 47/005 180/19.2 |
| 4,979,092 A * | 12/1990 | Bergene | A01B 63/1117 172/10 |
| 5,012,415 A * | 4/1991 | Boe | A01B 63/112 172/3 |
| 5,143,159 A * | 9/1992 | Young | A01B 63/112 172/7 |
| 5,190,111 A * | 3/1993 | Young | A01B 63/112 172/2 |
| 5,291,407 A * | 3/1994 | Young | A01B 63/112 172/7 |
| 5,293,944 A * | 3/1994 | Matsumoto | A01B 63/112 172/2 |
| 5,320,186 A * | 6/1994 | Strosser | A01B 63/112 172/7 |
| 5,421,416 A * | 6/1995 | Orbach | A01B 63/1117 172/3 |
| 5,454,432 A * | 10/1995 | Le Clezio | A01B 63/112 172/3 |
| 5,684,691 A * | 11/1997 | Orbach | A01B 63/112 172/2 |
| 5,755,291 A * | 5/1998 | Orbach | A01B 63/112 172/2 |
| 5,833,010 A * | 11/1998 | Scott | A01B 63/10 172/126 |
| 5,911,769 A * | 6/1999 | Orbach | A01B 63/112 172/7 |
| 5,986,544 A * | 11/1999 | Kaisers | B60T 8/00 280/504 |
| 5,997,024 A * | 12/1999 | Cowley | A01B 59/066 172/439 |
| 6,002,978 A * | 12/1999 | Marra | B60T 13/665 246/182 B |
| 6,035,943 A * | 3/2000 | Gerein | A01B 63/22 172/328 |
| 6,076,612 A * | 6/2000 | Carr | A01B 63/1117 172/7 |
| 6,123,155 A * | 9/2000 | Hollstein | A01B 63/10 172/2 |
| 6,131,062 A * | 10/2000 | Nielsen | H04L 29/06 172/2 |
| 6,196,327 B1 * | 3/2001 | Patel | A01B 63/112 172/7 |
| 6,321,851 B1 * | 11/2001 | Weiss | A01B 59/062 172/444 |
| 6,378,620 B1 * | 4/2002 | Luca | A01B 63/112 172/4 |
| 6,836,982 B1 * | 1/2005 | Augustine | E02F 9/205 37/348 |
| 7,798,241 B2 * | 9/2010 | Muzzy | A01B 63/112 172/239 |
| 9,282,690 B2 * | 3/2016 | Tilkes | A01B 76/00 |
| 9,649,984 B2 * | 5/2017 | Edelen | B60R 3/02 |
| 2002/0043374 A1* | 4/2002 | Luca | A01B 63/112 172/4 |
| 2002/0134558 A1* | 9/2002 | Bernhardt | A01B 69/004 172/7 |
| 2003/0217852 A1* | 11/2003 | Bernhardt | A01B 59/068 172/200 |
| 2007/0088488 A1* | 4/2007 | Reeves | G07C 5/085 701/117 |
| 2010/0071919 A1* | 3/2010 | Muzzy | A01B 63/112 172/9 |
| 2012/0143392 A1* | 6/2012 | Lurie | B64C 13/04 701/1 |
| 2012/0185137 A1* | 7/2012 | Schedgick | A01B 63/112 701/49 |
| 2013/0168113 A1* | 7/2013 | Gustafson | A01B 59/066 172/1 |
| 2013/0173116 A1* | 7/2013 | Gustafson | A01B 69/004 701/41 |
| 2014/0214290 A1* | 7/2014 | Brenninger | F02D 41/021 701/54 |
| 2014/0373534 A1* | 12/2014 | Jensen | F01K 23/065 60/618 |
| 2015/0039188 A1* | 2/2015 | Schedgick | A01B 63/112 701/50 |
| 2015/0173292 A1* | 6/2015 | Tilkes | A01B 76/00 172/430 |
| 2015/0177086 A1* | 6/2015 | Tilkes | G01L 5/136 172/430 |
| 2015/0201547 A1* | 7/2015 | Gschwendtner | A01B 63/112 172/7 |
| 2016/0029542 A1* | 2/2016 | Gschwendtner | A01B 63/10 701/50 |
| 2016/0029543 A1* | 2/2016 | Stich | A01B 59/043 701/50 |
| 2016/0101739 A1* | 4/2016 | Edelen | B60R 3/02 280/164.1 |
| 2016/0251005 A1* | 9/2016 | Morselli | B60T 8/1708 701/50 |

* cited by examiner

VEHICLE CONTROL SYSTEM

BACKGROUND OF THE INVENTION

Field of Invention

The invention relates to a control system of a vehicle, especially a tractor, equipped with a Continuously Variable Transmission (CVT) of the hydrostatic-mechanical split type which includes a hydraulic drive circuit in which a hydraulic pump supplies pressurised fluid to a hydraulic motor.

Description of Related Art

A hitch, such as a three-point linkage is one known arrangement used to attach implements to a drawing vehicle, for example an agricultural tractor. The implement may be fully mounted or semi-mounted on the tractor whereby a semi-mounted implement has a wheel engaging with the ground during soil operation while a fully-mounted implement puts all its load on the three-point linkage.

Three point linkages most frequently consist of two lower lifting arms to which an implement is attached. The lower lifting arms can be pivoted by respective hydraulic actuating cylinders to adjust the height position of the implement relative to the tractor. Furthermore, these lower lifting arms may be manually adjusted by length to be appropriate for an implement to be attached. An additional top link connects the implement to the tractor above the lower lifting arms. This top link is used to pivot the implement about a horizontal transverse axis and is adjustable by means of a threaded connection, or a hydraulic cylinder.

Alternative designs of three-point linkages are known, such as the arrangements shown in U.S. Pat. No. 6,321,851, US 2003/217852 and U.S. Pat. No. 5,997,024, in which the lower links are replaced by two or four variable length hydraulic rams. This variable length ram arrangement enables multi axis movement of any implement attached to the linkage.

To control the three-point linkage, modern tractors are mainly equipped with electronic linkage control systems to improve work quality and operator comfort during operation.

Such electronic linkage control systems operate in three well known modes:

Position control: In general, the tractor speed is kept constant by a speed control system and the position of the lower lifting arms is sensed directly or indirectly so that the working depth of the implement in the soil can be adjusted whilst the speed of the tractor is kept constant.

Draft control: The implement is raised and lowered in the soil depending on the draft force applied by the implement to reduce fuel consumption, avoid engine stall or avoid damage of the implement or tractor. Again, vehicle speed is kept constant. If the implement is lowered into the ground an initial draft is applied defining a zero level. The operator can then set a value representing a force increase which means that the operator can decide how fast the implement is lifted when a small force increase or a large force increase occurs. The value of the force entered by the operator does not represent an exact value of the force applied, e.g. 5 kN, but defines the responsiveness of the draft control. The objective of this function is to move the implement while avoiding excessive draft or pull force variations. Therefore, a draft force sensor, typically in the form of a draft force sensing pin which connects the lower lifting arms to the tractor chassis is used to measure the horizontal load applied to the tractor by the implement.

Intermix of position/draft control: This control arrangement, as its name implies, is a mixture of position and draft control in which a draft control system can only lift the implement within a limited range of positions. This function is provided to avoid excessive movement of the implement in the soil resulting in poor working quality. Again, vehicle speed is kept constant by a speed control system.

Only the draft control and intermix mode (both referred to as drag modes) operate under measurement of the drag force. Generally, deactivating the drag modes results in that the system enters the position mode with no drag force influencing the lifting heights. It may however be difficult to install a draft force sensing pin due to the complex three-dimensional geometry of a linkage. Further, the sensing pins may become dirty or damaged and thus may not function properly. Accordingly, a control system which does not rely on sensing pins is preferred.

A linkage control based on CVT parameters can result in that the control system moves the position of the linkage over a wide vertical displacement range as a reaction to the drag force. Various situations have been identified in which the drag mode should be deactivated since otherwise the draft control will cause the implement to crash to the ground, or cause the linkage to collide with the wheels of the tractor, or the drawbar of an trailer.

Detecting these situations can be quite difficult. Some implements are simply towed by attachment to a ball hitch rather than being mounted to the linkage, with actuators on the implement controlling operating conditions of the implement based on information received from the tractor, for example via a CAN-BUS link, or ISOBUS.

The following are situations, where if the drag mode is not deactivated, the movement of the linkage in response to the drag force may cause damage to the tractor or implement and/or be dangerous.

1. In the case in any tractor operational mode, the higher the speed of the tractor, the more dangerous is the consequence of an unintentional automatic movement of the implement in drag mode.

2. In the case where an implement is attached to a ball hitch on the tractor, or a when a tow bar is attached to the tractor, that is the linkage is not used, a drag force determined by the CVT would deliver a significant change of drag signal when the roll of the tractor changes, or the vehicle travels uphill, or downhill or during acceleration, or when coasting. Under normal circumstances, this would cause the linkage to move, and thus when a tow bar is attached would cause it, or the linkage to collide with the tow bar.

3. In the case where the tractor is reversing, or coasting, the change in drag signal would ordinarily cause the linkage to move.

4. In the case where the vehicle is at a stand still, the tractor speed is zero and therefore the drag mode is not deactivated. However, if the drag mode is then activated, the linkage is automatically lowered.

5. In the case where an implement is being transported in a lifted position, the operator is ordinarily responsible for deactivating the draft or intermix mode manually when travelling along a road with an implement held in a lifted position. If this is not done the drag force determined by the CVT delivers a significant change of drag signal when the roll of the tractor changes, or the vehicle travels uphill, or downhill or during acceleration, or during coasting. This could result in the implement to be lowered and crashing to the ground.

6. In the case where an implement is attached which is not in contact with the ground during operation, for example fertiliser spreaders and sprayers, the CVT delivers a significant change of drag signal when the roll of the tractor changes, or the vehicle travels uphill, or downhill or during acceleration. This would ordinarily result in the implement being raised which is not intended, or lowered which is also not intended and may be dangerous if not expected.

7. In the case when a tractor brake is activated during driving, the change in drag force may result in the linkage moving.

OVERVIEW OF THE INVENTION

It is an aim of the invention to provide a safer draft control mode on a tractor in which a control system deactivates the draft mode on the tractor when the tractor senses a parameter of a tractor mode and/or a parameter of an implement mode and compares it with pre-determined parameters in the control system which determine whether the draft mode should be deactivated or remain activated.

In accordance with the invention there is provided a control system for a tractor, wherein said control system controls an operating condition of an implement attached to attachment means on the tractor and said control system comprises a sensing means providing a force signal which is indicative of the current pull force necessary to pull the implement in a desired position, the system further comprising a control means which receives the force signal and measurement means for measuring at least one parameter associated with a tractor mode and/or an implement mode, and wherein the position of the implement is adjusted to a new position when said force signal varies, characterised in that the control system comprises pre-determined parameter values associated with a tractor and/or implement mode and wherein the measured parameter is compared with the pre-determined parameter values and if the measured parameter would result in an undesired movement of the implement attachment means, the force signal is deactivated, or the response to the force signal is deactivated to prevent undesired movement of the attachment means.

In this way the drag mode can be automatically deactivated and thus unnecessary and dangerous automatic movement of the linkage and any attached implement in response to a change in draft signal is avoided.

Preferably, the implement attachment means is a linkage.

Preferably, the pre-determined parameter value comprises a permitted/non permitted value which if exceeded or not attained by the measured parameter results in the force signal, or the response to the force signal being deactivated.

Preferably, a measured implement mode determines whether an implement is attached to a ball hitch or a linkage.

Preferably, the pre-determined tractor mode comprises a maximum tractor speed and if the measured tractor speed exceeds it, the force signal is deactivated, or the response to the force signal is deactivated.

Preferably, the pre-determined tractor mode comprises any of reversing, coasting, travelling uphill, travelling downhill, braking or accelerating of the tractor and if the measured tractor mode detects any of the pre-determined tractor modes, the force signal is deactivated, or the response to the pull force signal is deactivated.

When the pre-determined tractor mode is in stand still, the drag mode is preferably deactivated.

A pre-determined implement mode preferably comprises a raised transport mode and if the measured implement mode detects this implement position, the force signal is deactivated, or the response to the force signal is deactivated.

Alternatively, a pre-determined implement mode may comprises the attachment of a implement type which does not contact the ground during operation and if the measured implement mode detects said implement type, the force signal is deactivated, or the response to the force signal is deactivated.

The detection of different measured parameter values associated with the tractor and/or implement modes is preferably prioritised and the control system deactivates the force signal or the response to the force signal depending on the prioritisation of the detected measured parameter values.

The force signal is preferably provided by a pressure sensing means within the hydraulic circuit of a transmission/drive system.

For linkage mounted implements, a control system can control the position of an implement attachment linkage relative to the tractor via an actuator means which raises and lowers the implement linkage relative to the tractor. Such a control system can be used to control a linkage which is attached to the rear and/or front of the tractor. No additional draft force sensors are involved as the variation of the pull force of the linkage is determined from the variation in the hydraulic drive circuit pressure. Also the need to use existing pin sensors is avoided.

BRIEF DESCRIPTION OF THE DRAWINGS

The present invention will now be described, by way of example only, with reference to the accompanying drawings in which.

DESCRIPTION OF EXAMPLE EMBODIMENTS

Figure 1:
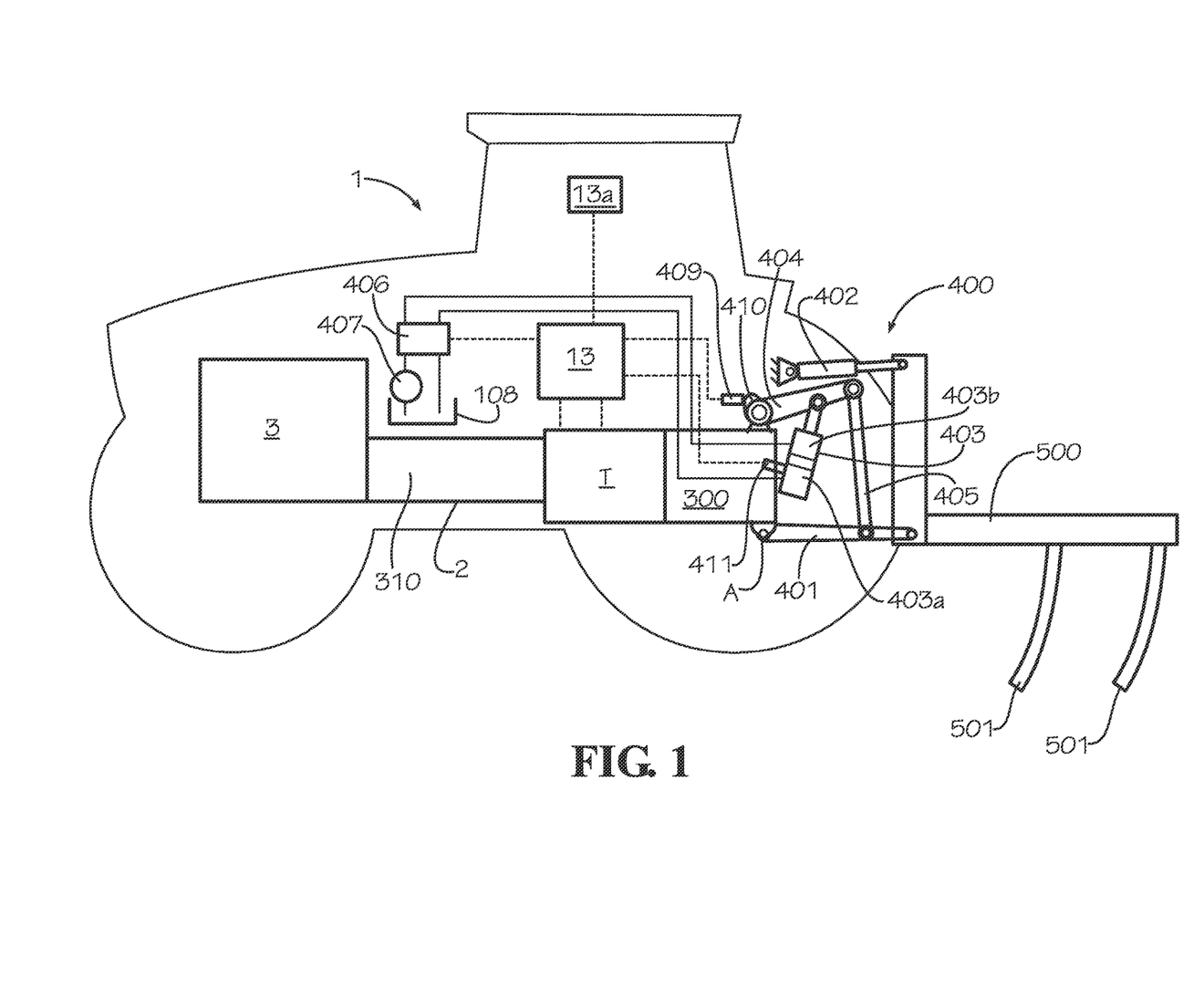
FIG. 1 shows a side view of a tractor with a linkage control system embodying the present invention.

Referring to the drawings, an agricultural tractor 1 has a driveline 2 having a combustion engine 3, a flywheel 4, a continuously variable transmission, or CVT, T of the hydrostatic-mechanical split type and a rear axle housing 300. Combustion engine 3 is connected to the CVT, T by chassis part 310.

A three-point linkage 400 is attached to the rear axle housing 300 and mainly consists of two lower lifting arms 401 to which an implement is attached. A plough 500 with ground engaging means 501 is attached to lower lifting arms 401. An additional top link 402 connects the implement 500 to the tractor 1. The top link 402 is of a hydraulic type adjustable in length to adjust the inclination of the plough 500 with the ground. The lower lifting arms 401 can be pivoted about axis A by respective hydraulic actuating cylinders 403 which move rocker arm 404 and lift rod 405. The height of the lifting arms can thus be changed by pivoting the lifting arms about axis A and this movement is hereafter referred to as the vertical displacement of the lifting arms. The hydraulic actuating cylinders 403 are supplied with an actuating fluid by a control valve 406. Control valve 406 controls which chamber 403a (to lift the implement) or chamber 403b (to lower the implement) of the hydraulic actuating cylinders 403 is charged with fluid. Control valve 406 is connected to a pump 407 which is driven by combustion engine 3 and connected with a fluid tank 108.

The position of the lower lift arms 401 is indirectly measured by a position sensor 409 which senses the position of a cam 410 attached to rocker arm 404.

An additional pressure sensor 411 is provided to measure the fluid pressure in the chamber 403a of the hydraulic actuating cylinders 403. The fluid in chamber 403a is compressed when the implement weight is fully taken up by the three-point linkage 400 and therefore a pressure increase indicates movement of the implement to a high position for transportation.

A tractor control unit 13 is provided to control various functions of the vehicle. The control unit 13 is electronically connected to various components via CAN-BUS, for example, the transmission and display and input devices. The control unit 13 also contains software to drive the electronic linkage control system. The control unit 13 is connected to an input and display device 13a in the tractor cab to receive input from the operator and to show information to the operator.

Position sensor 409, control valve 406 and pressure sensor 411 are connected to the control unit 13.

Figure 2:
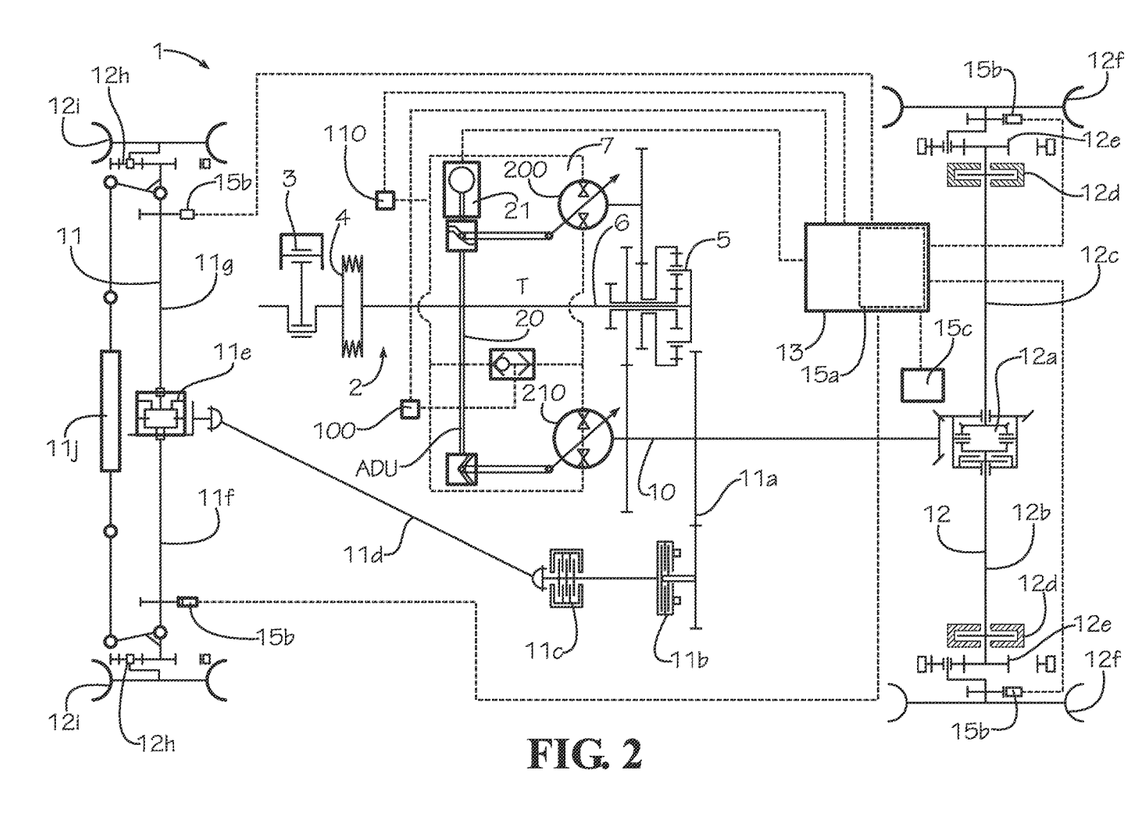
FIG. 2 shows a driveline of a tractor with a hydrostatic mechanical CVT and having a linkage control system embodying the present invention.

FIG. 2 shows the driveline 2 of the tractor 1 in more detail. The torque supplied by combustion engine 3 via a flywheel 4 is distributed to a mechanical branch 6 and a hydrostatic branch 7 of the transmission T via a planetary drive 5. The hydrostatic branch 7 mainly consists of hydrostats 200, 210, wherein hereafter the hydrostat 200 is designated as the hydraulic pump 200 and the hydrostat 210 as the hydraulic motor 210. Both hydraulic pump 200 and hydraulic motor 210 can be pivoted by an adjustment unit, also referred to as an ADU to change delivery/intake volume as described in FIG. 3.

Both the mechanical branch 6 and the hydrostatic branch 7 of the transmission are driven and brought together on a CVT output shaft 10 at the end of CVT, T. The CVT output shaft 10 delivers an output torque to the respective driveline front and rear axles 11 and 12.

CVT output shaft 10 drives a rear axle differential 12a splitting the torque to a left rear axle portion 12b and a right rear axle portion 12c. Both rear axle portions 12b, 12c are provided with brakes 12d, final reduction gears 12e and wheels 12f.

CVT output shaft 10 also drives a front axle drive gear pair 11a followed by a front wheel drive clutch 11b to disengage and engage front axle driveline. In addition a front brake 11c is provided which is connected to a cardan shaft 11d which ends in a front axle differential 11e splitting the torque to a left front axle portion 11f and a right front axle portion 11g. Both front axle portions 11f, 11g are provided with final reduction gears 12h and wheels 12i. Wheels 12i are steerable about a substantially vertical axis using a hydraulic steering cylinder 11j mounted on the front axle.

The driveline 2 is also equipped with an anti-skid system which mainly consists of an anti-skid control unit 15a integrated in the tractor control unit 13 of the tractor 1, speed sensors 15b for each wheel 11i, 12f and a further anti-skid sensor 15c. The anti-skid sensor 15c provides parameters to control the brake function, for example acceleration in various axes, or inclinations of the vehicle. Anti-skid control unit 15a may be separate from tractor control unit 13. The direction of driving can be determined by a speed sensor 150 which measures the direction of rotation of hydraulic motor 210 or CVT output shaft 10 which is connected to the wheels.

Alternatively, a GPS system may also deliver parameters such as the acceleration or the inclination of the vehicle.

Figure 3:
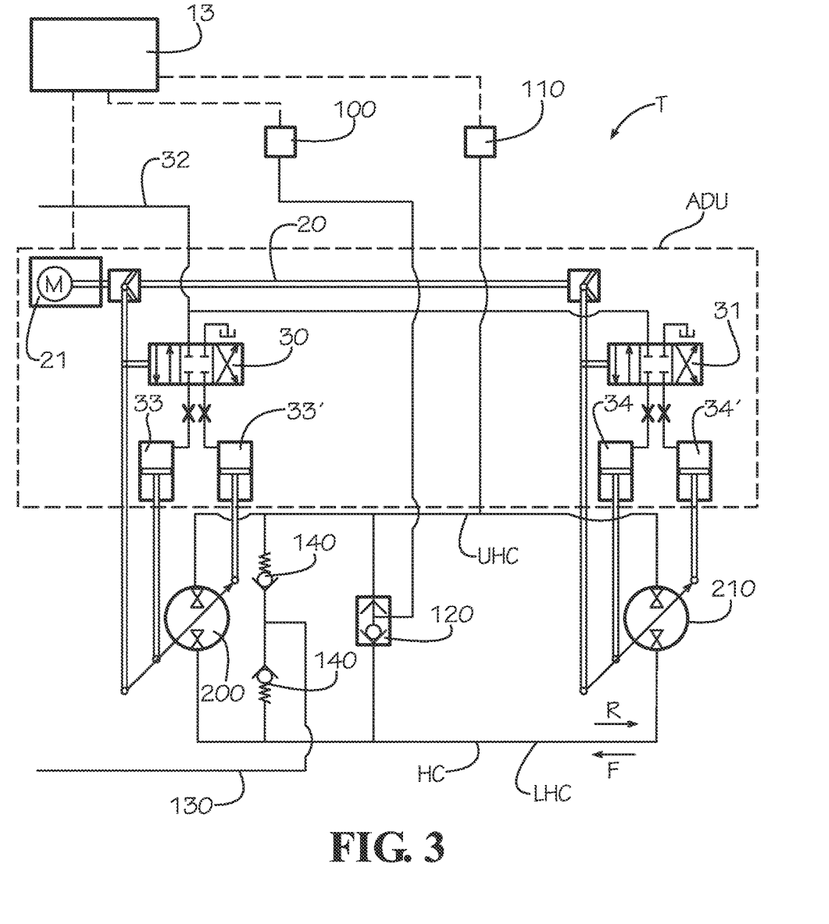
FIG. 3 shows the hydrostatic mechanical CVT portion of the driveline of FIG. 2 in more detail.

FIG. 3 shows a diagrammatic sketch of the hydrostatic mechanical split type transmission T having an adjustment unit ADU defined by the broken line. The components outside the broken line belong to the power unit of the transmission.

The hydrostats 200, 210 illustrated in FIGS. 2 and 3 are an axial piston pump and an axial piston motor of an oblique-axis design, in which the delivery/intake volume is changed by the pivoting of the axis of rotation of the pistons to an axle drive shaft, not shown.

By means of a first valve unit 30 allocated to hydraulic pump 200 and by means of a second valve unit 31 allocated to the hydraulic motor 210, the individual pivot angle of the hydraulic pump 200 and/or of the hydraulic motor 210 can be adjusted.

Depending on the specified revolution speed transmission ratio iT set by the operator via control unit 13 an actuator element 20 is rotated by means of an actuator motor 21. The actuator motor 21 is in this case controlled by the control unit 13. Because the valve units 30, 31 are coupled to the actuator element 20, these valve units 30, 31 are displaced corresponding to the actuator element 20. As a result, oil present in a line 32 can flow into a cylinder 33, 33', 34, 34' allocated to the valve unit 30, 31.

Due to the displacement of the actuator element 20, the oil flow is accordingly directed out of line 32 and into the cylinders 33, 33', 34, 34'. Thereby the pivot angle of the hydraulic pump 200 and of the hydraulic motor 210 is adjusted. The pivot angle, and therefore the delivery volume of the hydraulic pump 200 and the intake volume of the hydraulic motor 210 can be changed accordingly. This makes it possible for the revolution speed of the axle drive shaft (not shown in FIGS. 2 and 3) to be adjusted, and with it the revolution speed transmission ratio of the transmission T.

The hydraulic pump 200 is connected by fluid circuit HC to the hydraulic motor 210. The fluid circuit HC in has an upper circuit UHC and a lower circuit LHC. The direction of the arrow F represents a flow direction of the fluid located inside the hydraulic circuit HC during forwards travel of the tractor and the direction of the arrow R represents a flow direction of the fluid during reverse travel of the tractor.

By means of a first measuring unit 110, the pressure value pUHC prevailing in the upper circuit UHC can be measured. This pressure value pUHC is then sent to the control unit 13 represented in FIG. 1. Moreover, both the pressure in the upper circuit UHC as well as the pressure in the lower circuit LHC is conducted by means of a shuttle valve 120 to a second measuring unit 100 in order to measure the pressure value pHCmax. This pressure value pHCmax is also sent to the control unit 13.

The shuttle valve in the transmission T is designed in such a way so as to communicate to the second measuring unit 100 the greater of the two pressures present in the upper circuit UHC or the lower circuit LHC as a pressure value pHCmax. When the tractor is stationary, the second measuring unit 100 issues a system pressure of the upper circuit UHC or the lower circuit LHC as pressure value pHCmax. A rotation sensor, not visible in FIG. 2, is arranged at the hydraulic motor 210 with which the direction of the rotation of the hydraulic motor 210 is determined and the direction of travel of the vehicle can be concluded.

When the vehicle is stationary a system pressure of about 15 bar is set in the fluid circuit HC. This system pressure of 15 bar results from the fact that, by means of a supply line 130, the fluid circuit HC is supplied with a constant system pressure by means of a constant hydraulic pump, not shown, driven by the combustion engine. Two check valves 140 prevent oil from flowing back into the supply line. As soon as the utility vehicle moves or the transmission is no longer stationary, the pressure inside the fluid circuit rises, depending on the drive torque, to a high-pressure value of over 15 bar. With an average loading of the transmission, a high-pressure value of between 250-350 bar is provided. A limit of 500 bar must not be exceeded to avoid over stressing of the transmission and its components.

Pressure pHCmax, transmission ratio iT, or the pivot angle of the hydraulic motor 210, or alternatively the intake volume V of the hydraulic motor 210 represent parameters which determine the output torque Mhydr of the hydraulic branch 7. As the transmission ratio iT is known, the pivot angle and intake volume parameters of the hydraulic motor 210 can be determined by look-up tables or characteristic maps.

As described in relation to FIG. 1, the torque supplied by combustion engine 3 is distributed to a mechanical branch 6 and a hydrostatic branch 7 of the hydrostatic mechanical split type transmission T in which the fraction of torque transmitted by both branches depends on the transmission ratio iT. So if the fraction of the hydrostatic branch 7 is determined as described above, the fraction Mmech transmitted by the mechanical branch 6 can also be determined depending on the current transmission ratio iT.

The overall output torque MOT of the transmission can then be calculated from $$MOT = Mhydr + Mmech = \frac{pHCmax * V}{2\pi} + Mmech \quad (1)$$

The pressure pHCmax is measured as described above and the intake volume V of the hydraulic motor 210 is determined by characteristic maps depending on the transmission ratio iT.

The output torque MOT of the transmission is supplied to the wheels resulting in a wheel torque MW:

$$MW = MOT * iTW \quad (2)$$

In this equation iTW represents the overall gear ratio between the transmission and wheel and is the product of the gear ratio of the rear axle differential 12a and the final reduction gears 12e in rear wheel mode, for example:

ITW=9.2 (for the real axle differential 12a)×3.58 (for the final reduction gears 12e)=32.97 overall.

Figure 4:
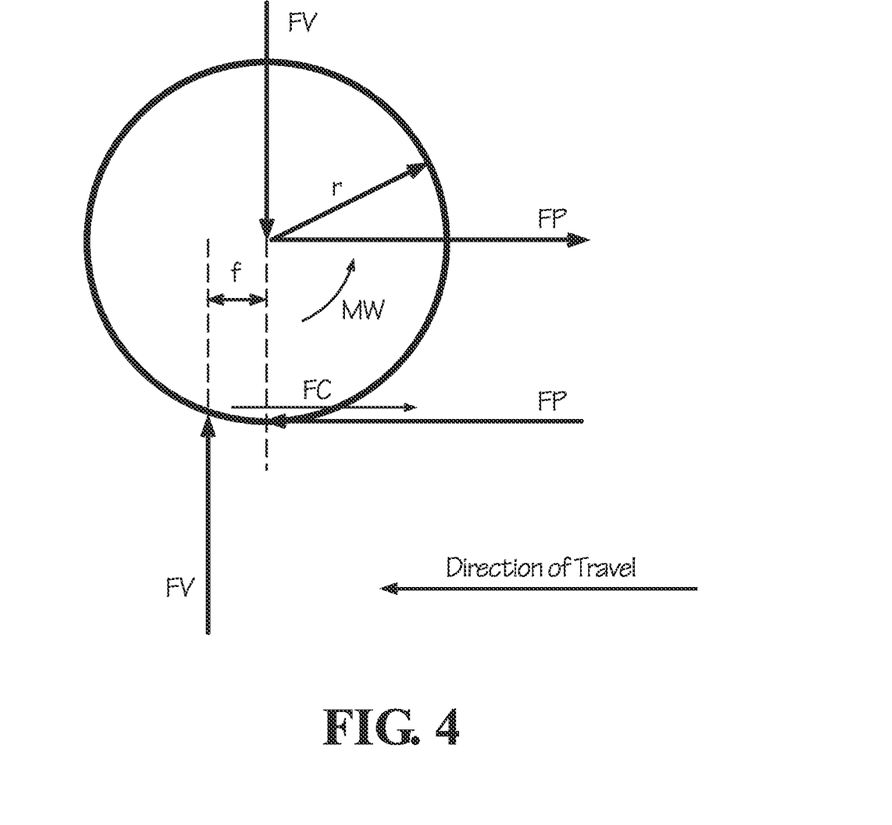
FIG. 4 shows the forces acting between a tractor wheel and the ground.

Knowing the wheel torque MW, the pull force FP can be calculated by using the known relationship of the forces on a wheel as shown in the diagram in FIG. 4.

$$MW = FP*r + FV*f = FC*r \quad (3)$$

In which:
r represents the effective wheel radius depending on tyre pressure and wheel size provided by the wheel manufacturer in respective tables f represents the offset of the point of application of the wheel vertical force (see FIG. 4) caused by roll resistance and sinking of the wheels The circumferential force FC is a theoretical value achieved by converting equation (3):

$$FC = \frac{MW}{r} = FP + FV * \frac{f}{r} \quad (4)$$

As the linkage control only needs an indication of an increase in pull force FP, FV (which remains constant) can be ignored and so the equation can be simplified to:

$$\frac{MW}{r} = FP \quad (4)$$

Thus an increase of the pull force ΔFP would result in an increase of the torque demand ΔMW and therefore an increase of pHCmax.

As pHCmax is constantly measured in the system, this parameter can be used to control the linkage based on an increased draft force applied by the implement.

So by monitoring pHCmax which is already done for transmission control and protection purposes, an increase or decrease of the draft or pull force can be detected and processed in the electronic linkage control system to provide functions like draft control and intermix position/draft control. The change in drag force is fed into a tractor control unit which is programmed to lift, or lower the linkage in response to the change as programmed.

The transmission can provide further parameters concerning the operation of the tractor such as the driving direction of the tractor and whether the tractor is in a pull/coast mode which can be used to control the linkage. By pull mode it is meant that the vehicle is driven by the engine/transmission (for example, when going uphill), while in coast mode, the vehicle is driven by gravity, that is the vehicle weight drives the tractor under gravity.

The direction of driving can be determined by a speed sensor 150 which measures the direction of rotation of hydraulic motor 210 or CVT output shaft 10 being connected with the wheels.

The detection of pull or coast mode for both forward and reverse driving directions can be detected by sensors. In general, the signals received by speed sensor 150 and pressure sensors 100,110 are sufficient to determine whether the tractor is in coast or pull mode. The pull mode in a forward driving direction can be detected in two stages: Firstly, the speed sensor 150 indicates forward driving. Secondly, the coast mode in this driving direction is characterized by the fact that the hydraulic motor 210 is driven by the pump 200 and the oil flows in direction F. Thereby, the pressure in the upper hydraulic circuit (UHC) will increase to high pressure (measured with pressure sensor 110) while the pressure in the lower hydraulic circuit (LHC) will be at a system pressure of 15 bar. As pressure sensor 100 always measures the highest pressure in UHC or LHC circuits, both pressure sensors 100,110 will measure a high pressure.

The coast mode in the forward driving is different. Speed sensor 150 indicates forward driving the coast mode in this driving direction is characterised by the fact that hydraulic motor 210 hydraulically drives pump 200. Thereby, the pressure in the lower hydraulic circuit LHC will increase to high pressure level (measured with pressure sensor 100) while the pressure in the upper hydraulic circuit UHC will be at a system pressure of 15 bar (measured with pressure sensor 110). So in this case both pressure sensors measure different values.

The same distinction is also possible in reverse driving by considering the pressures measured with sensors 100, 110.

Alternatively, a coasting mode could be detected by other means, for example, by the engine control system which is normally provided with coast/pull detection means by consideration of fuel injection.

Acceleration of the vehicle can be determined by CVT parameters as explained in applicant's pending application WO 2013/053564.

In accordance with the invention, the drag mode is deactivated when a sensed parameter associated with an implement and/or tractor mode is detected which would lead to an unnecessary movement of the linkage. This thus prevents the implement or tractor being damaged unnecessarily by a downwards or upwards movement of the linkage in response to a change in drag force.

There are various situations where the movement of the linkage in response to a change in drag force may cause problems when in drag mode which involve implement modes and tractor modes The implement modes describe which implement is attached to the tractor, or how it is carried on the tractor, or how it is attached to the tractor and comprise the situation of an implement attached to a ball hitch and not the linkage, or stowed for transportation, or the attachment of a material application implement for operation without contacting the ground, or an implement semi mounted or fully mounted. The tractor modes comprise tractor roll, tractor speed, reversing, coasting, braking, acceleration and travelling along a gradient. The term implement covers all tools, attachments and equipment which can be attached to a tractor including but not limited to the following: ploughs, tow bars, sprayers, mowers, drills and planters.

The drag force is the force applied by the implement against the pull force of the tractor and therefore is applied in a direction opposite to the direction of travel of the tractor. A change in pull force results in a change of drag force and vice versa if speed of the tractor is kept constant. In the case where an implement is attached to a ball hitch and not the linkage, or a trailer is connected by a tow bar to the tractor. A decrease in drag force, for example if the tractor travels downhill, or during coasting, this may result in the linkage being lowered which may cause the linkage to collide with the ground. Similarly, if an increase in drag force is detected, for example if a tractor is travelling uphill, or during acceleration the linkage may be lifted which may result in an attached tow bar colliding with the tractor wheels.

So, in a first step, an implement is detected for example, via the electric supply/light connector. Alternatively fluid couplings may be used to detect the attachment of an implement. But this connector does not provide information as to where the implement is attached, that is whether it is attached to the linkage or to the ball hitch.

There are various ways in which an implement is attached to the linkage. The effect of the drag mode on the linkage may be different depending on how the implement is mounted as is explained below:

When an Implement is Semi-Mounted

The pressure in the lifting cylinders cannot always be used to detect whether an implement is unattached or semi mounted to the linkage. For example, an unloaded linkage may result in the lifting cylinders indicating a pressure of 11 bar which represents a mass of the linkage as being around 600 kg. When, during transport on the road, a plough is mounted to the linkage and the wheels of the plough engage the ground so that the plough is semi mounted, the pressure may change to about 14 bar since the ground supports some, or most of the weight of the plough. When the plough engages the ground during soil work, the pressure may increase to a much higher level, for example more than 20 bar. On the headland, when fully lifting the plough from the ground for rotation, the pressure may increase to about 45 bar. The difference in pressure between the implement being semi mounted during transport and an unloaded linkage is small, around: 2 bar+/−a tolerance of 1 to 2 bar. This may result in that the condition of a plough being semi mounted is not detectable by the system and as a result, the drag mode will remain in an active mode because the pressure limit has not been reached. A decrease in drag force, for example if the tractor travels downhill, or during coasting, may result in the linkage being lifted which may cause the linkage to collide with the wheels of the tractor, or the ground which is dangerous.

In this condition, the vehicle speed is taken into account. When the speed exceeds a certain level which is indicative of the plough in a transport position during road operation such as greater than 20 km/h, the drag modes are deactivated. Other parameters indicative of a transport position are for example, a road/field switch which is used by the operator to switch between field and road travel. In this situation, the operator must confirm that the transport operation is completed before the system enables activation of the drag mode.

Fully Mounted Implement Raised to Transport Position

In cases where a fully mounted implement is stowed for transportation in a lifted position, an active drag mode could result in undesired linkage movement towards the ground. The cylinder pressure may again not be suitable to detect the stowed position. In accordance with the invention, the implement mode is detected in different ways:

When moving an implement into a transport position, the operator can manually adjust the height whereby he may chose a position which is not too low (to avoid contact with ground during damping) but which is also not to high (because the tractor driving stability is worsened with the height of the implement).

Presuming there is a certain height at which any implement is off the ground and in a transport position, the position sensors (already needed for position control) may be used to determine the height which an implement is carried and the drag mode is deactivated. For example, with a the semi-mounted implement attached, the vehicle speed is considered, so that when the speed exceeds a certain level indicative of a road operation the drag modes are deactivated.

In the case of an implement mode where an implement is attached to a ball hitch on the tractor, that is the linkage is not used, a drag force determined by the CVT would deliver a significant change of drag signal when the tractor mode changes, such as the roll of the tractor changes, or the vehicle travels uphill, or downhill or during acceleration. Each of these conditions can be detected by parameters/signals of the CVT as described above using speed sensor 150 and pressure sensors 100, 110 or any other parameters of the CVT or vehicle. Under normal circumstances, the tractor modes would cause the linkage to move, and thus when a tow bar is attached would cause it, or the linkage to collide with the tow bar. Therefore, in accordance with the invention, the parameters associated with the tractor modes are sensed with or without the implement mode being sensed. If the sensed tractor mode is one of roll, uphill, downhill, or acceleration, and the implement mode is one in which the implement is attached to a ball hitch, the drag mode is deactivated.

Coasting or Reversing

In the case where the tractor is coasting or reversing, the change in drag signal would ordinarily cause the linkage to move.

In accordance with the invention, coasting can be detected as described above and the drag mode is deactivated.

There are implements which are operated in reverse driving, such as tractor mounted maize choppers or stone buriers or stump grinders. These implements are too heavy for front attachment (which is limited in capacity). For these implements, tractors are equipped with reverse driving stations. But most of the implements are not operated in drag mode.

In accordance with the invention, reversing of the tractor is detected by speed sensor 150 and the drag mode is deactivated.

If there are implements in reverse mode requiring drag mode, it is necessary to compare the drag mode reaction with that in forward driving. An increasing drag force in reverse mode would result in the height being reduced (as the load counteracts the drag force measured in forward direction) rather than an increase. This may cause damage.

So according to another aspect of the invention, reversing is detected by speed sensor 150 and the height of the linkage is adjusted the same amount but in an opposite direction as compared with that in forward driving.

Stand-Still

In the case where the vehicle is brought to stand still, the tractor speed is zero and therefore the drag mode is deactivated. If drag mode is not deactivated in accordance with the invention, the system is not able to detect whether the drag force is reduced due to standstill or due to the fact that the system has completely lifted the implement out of the ground (caused by previous drag force increase)

However, if the drag mode is then activated by the operator, the linkage is automatically lowered.

A further application in which implements are driven when the tractor is in stand still, for example manure agitators which are used to stir a manure pit are also conceived. These manure agitators are attached to the rear linkage and are provided with a rotating stirrer driven by the Power Take Off (PTO). For operation, the agitators are lowered into the manure pit and the stirrer is rotated. This rotation draws back a force on the agitator which may cause the drag mode to change the lifting height of the linkage, which is not desirable. In accordance with the invention, the tractor mode of the tractor being in stand still is detected by sensor 150 and the drag mode is deactivated.

Implement not Engaging Ground During Operation

In the case where an implement is attached which does not contact with the ground during operation, for example fertiliser spreaders or sprayers, the CVT delivers a significant change of drag signal when the roll of the tractor changes, or the vehicle travels uphill, or downhill or during acceleration. This would ordinarily result in the implement being raised which is not intended, or lowered which is also not intended and may be dangerous if not expected. Again pressure in the lifting cylinders cannot be used to detect the implement condition as described above especially as in case of a fertiliser spreader, the pressure in the lifting cylinder would change as the fertiliser tank empties during operation.

In accordance with the invention, the implement mode of the attachment of an implement not contacting ground during operation is detected by ISOBUS connections and the drag mode deactivated.

If the ISOBUS connection is not available to identify the implement type (ground engaging or not) the PTO may be used to detect an implement not engaging ground. Most of the implements which do not engage the ground are driven by the PTO while most of the implements are used for heavy soil work and thereby require drag modes and are only pulled over field without a PTO drive.

In accordance with the invention, the implement mode of the attachment of an implement not contacting ground during operation is detected by PTO activation and the drag mode is accordingly deactivated. When deactivating drag mode based on PTO, the operator is given a message so he can manually activate the drag mode again.

Measurement of the different tractor and implement modes which leads to deactivation of the drag mode are prioritised by the control system. For example, deactivation of the drag mode owing to the sensing of the stowed transport position of an implement is prioritised over the deactivation of the drag mode based on the pre-determined speed limit being exceeded. Further still, deactivation of the drag mode based on the measurement of the tractor in standstill) takes priority over the deactivation of the drag mode based on the sensing of braking parameters.

In accordance with the invention, the movement of the linkage is deactivated in the drag mode by pre-determined settings defined by the linkage or tractor manufacturer or by the operator.

Although the foregoing examples have concentrated on linkage control systems, as indicated previously the invention is not so limited, being applicable to any tractor control system for the controlled operation of an implement where a draft force measurement is required.

Furthermore, in the described embodiments several vehicle conditions are detected by parameters of the CVT. It is envisaged that these conditions could be detected by other means on a vehicle.

In the shown embodiment, the linkage control is based on CVT parameters while the invention is also applicable to a linkage control based on sensing pins wherein the above described parameters of the vehicle (condition a re provided by other sources than the CVT.

So generally, in the case of a tractor being in any implement mode, the higher the speed of the tractor, the more dangerous the consequence of an unintentional automatic movement of the implement in drag mode. Thus, in accordance with the invention, the tractor control system is provided with a pre-determined upper speed limit value and if the tractor speed exceeds this value, the drag mode is deactivated. Safety at higher speeds is thus improved. An implement mode, such as the stowed transport position of the fully mounted implement could also be sensed in addition or alternatively to the speed of the tractor and where the pre-determined values are breached, the drag mode is deactivated.

The invention claimed is:

1. A tractor control system, wherein said control system controls an operating condition of an implement attached to an implement attachment linkage on a tractor and said control system providing a force signal which is indicative of the current pull force necessary to pull the implement in a desired position, the system further comprising:

a control unit which receives the force signal, the control unit further arranged to detect a tractor mode and/or an implement mode; and at least one measurement device for measuring at least one measured parameter value associated with the detected tractor mode and/or implement mode, and wherein the position of the implement is adjusted to a new position when said force signal varies, characterised in that the control system comprises pre-determined parameter values associated with the detected tractor mode and/or implement mode and wherein the at least one measured parameter value is compared with the pre-determined parameter values and when the measured parameter value would result in an undesired movement of the implement attachment linkage, the force signal is deactivated, or the response to the force signal is deactivated to prevent undesired movement of the implement attachment linkage for the detected tractor mode and/or an implement mode;

wherein when a pre-determined tractor mode is in stand still, a drag mode is deactivated.

2. The tractor control system as claimed in claim 1 wherein the pre-determined parameter value comprises a permitted/non permitted value which when exceeded or not attained by the measured parameter value, results in the force signal, or the response to the force signal being deactivated.

3. The tractor control system as claimed in claim 1 wherein the implement mode comprises a mode which determines whether an implement is attached to a ball hitch or a linkage.

4. The tractor control system as claimed in claim 1 wherein the pre-determined tractor mode comprises any of reversing, coasting, travelling uphill, travelling downhill, braking or accelerating of the tractor and when the measured tractor mode detects any of the pre-determined tractor modes, the force signal is deactivated, or the response to the pull force signal is deactivated.

5. The tractor control system as claimed in claim 1 wherein the pre-determined implement mode comprises a raised transport mode and when the measured implement mode detects said raised transport mode, the force signal is deactivated, or the response to the force signal is deactivated.

6. The tractor control system as claimed in claim 1 wherein the pre-determined implement mode comprises the attachment of an implement type not contacting ground during operation and when the measured implement mode detects said implement type, the force signal is deactivated, or the response to the force signal is deactivated.

7. The tractor control system as claimed in claim 1 wherein the at least one measured parameter values associated with the tractor mode and/or implement modes are prioritised and the control system deactivates the force signal or the response to the force signal depending on the prioritisation of the at least one measured parameter values.

8. The tractor control system as claimed in claim 1 wherein the force signal is provided by a pressure sensor within the hydraulic circuit of a transmission/drive system.

9. A tractor comprising the tractor control system as claimed in claim 1.

* * * * *